Sept. 13, 1938.　　　　H. G. DYBVIG　　　　2,130,122
BALANCING MACHINE
Filed Jan. 18, 1937　　　3 Sheets-Sheet 1

INVENTOR.
Henry G. Dybvig
Pro Se
BY
ATTORNEY.

Sept. 13, 1938.   H. G. DYBVIG   2,130,122
BALANCING MACHINE
Filed Jan. 18, 1937   3 Sheets-Sheet 2
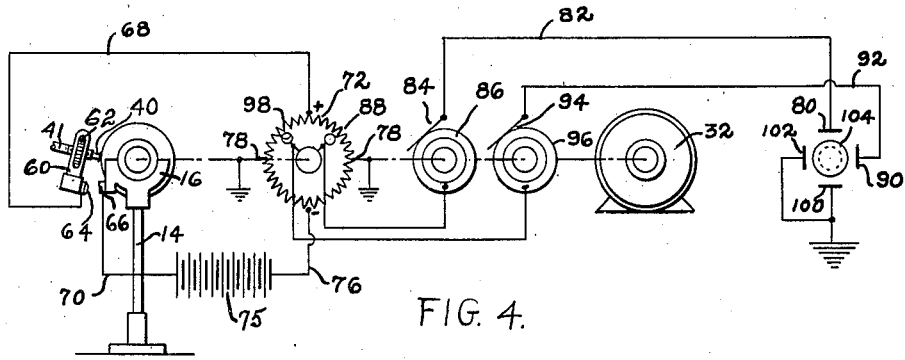
FIG. 4.
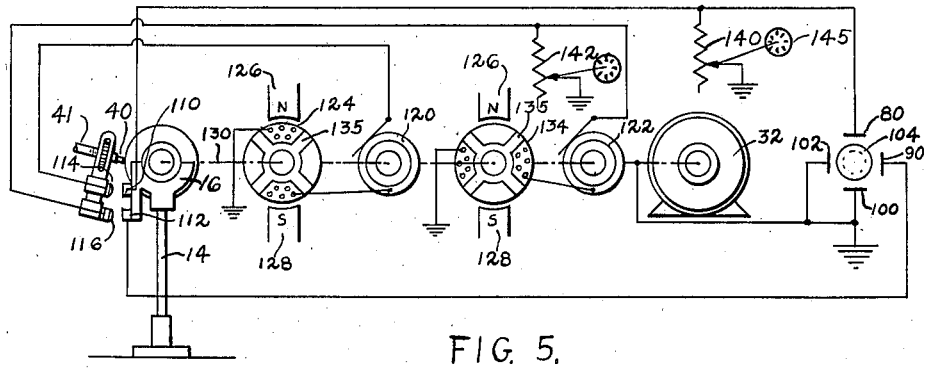
FIG. 5.
FIG. 6.
INVENTOR.
Henry G. Dybvig
Pro Se
BY
ATTORNEY.

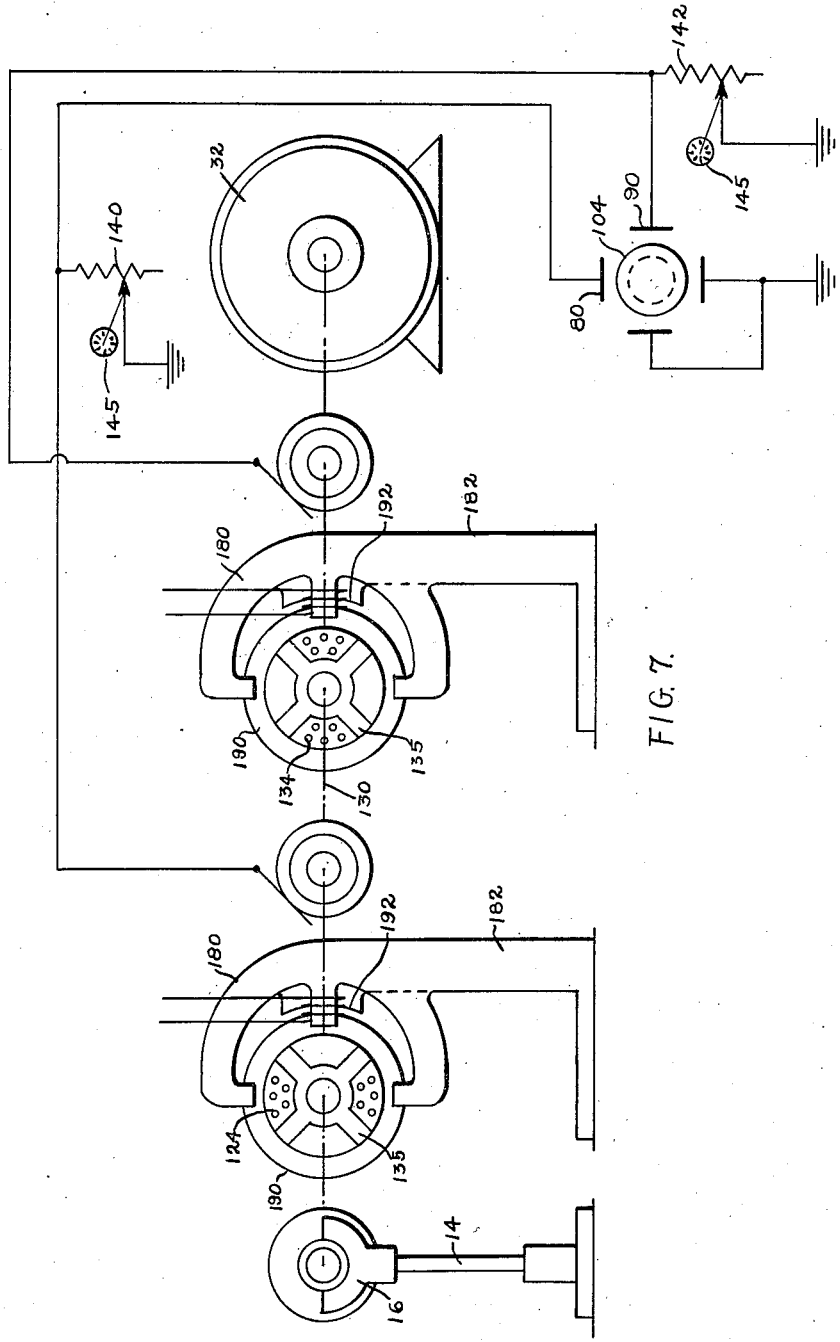

Patented Sept. 13, 1938

2,130,122

UNITED STATES PATENT OFFICE 2,130,122

BALANCING MACHINE

Henry G. Dybvig, Dayton, Ohio, assignor to Harry W. Moore, Dayton, Ohio

Application January 18, 1937, Serial No. 121,183

12 Claims. (Cl. 73—51)

This invention relates to balancing machines and in more particular to a balancing machine utilizing a cathode-ray tube to indicate the angle of unbalance.

In testing bodies for unbalance upon balancing machines, the vibration caused by the unbalance of the rotary body is utilized in measuring the amplitude of vibration and the angle of unbalance. This has been done electrically by various devices, illustrative of which is a rotary light as disclosed in the Harry Moore application Serial No. 104,075 filed Oct. 5, 1936 for Dynamic balancing apparatus, and a plurality of stationary lights energized periodically through a suitable distributor, as disclosed in the Moore application Serial No. 680,225 filed July 13, 1933 for Dynamic balancing apparatus.

An object of this invention is to provide a rotary field either electrostatic or electromagnetic, deflecting a cathode-ray periodically to thereby indicate the angle of unbalance.

Another object of this invention is to produce an electrically rotating field by tapping an annular resistance at a plurality of points.

Another object of this invention is to generate two sign wave curves synchronized with the rotating body for producing a rotating field.

Another object of this invention is to provide a rotary field, the magnitude of which may be controlled so as to obtain the proper deflection of the cathode-ray.

Other objects and advantages reside in the construction of parts, the combination thereof and the mode of operation, as will become more apparent from the following description.

Fig. 1 is a schematic view showing a dynamic balancing machine similar to those disclosed in the above identified Moore applications, having added thereto suitable attachments for use with a cathode-ray oscillograph.

Fig. 2 discloses a transverse cross sectional view of the device disclosed in Fig. 1.

Fig. 4 is a schematic wiring diagram of the preferred embodiment.

Figure 1:
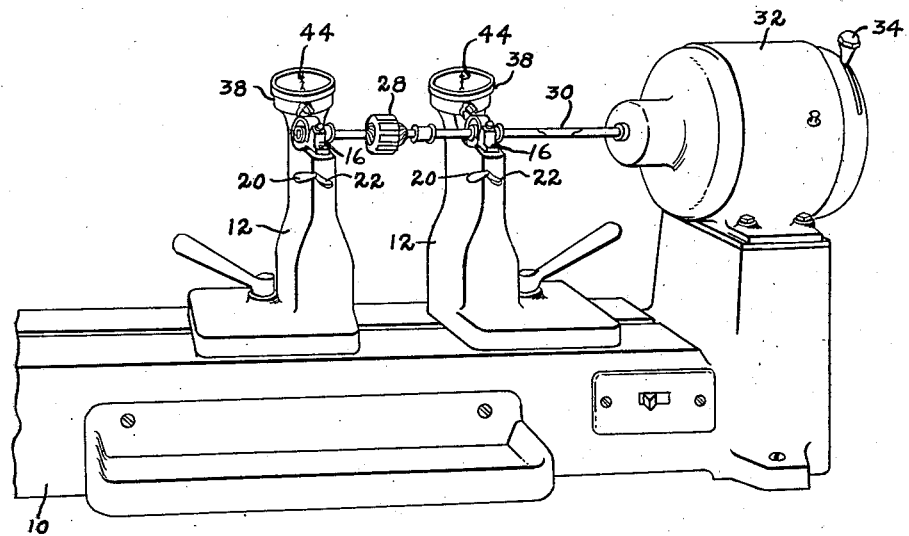
Figure 3:
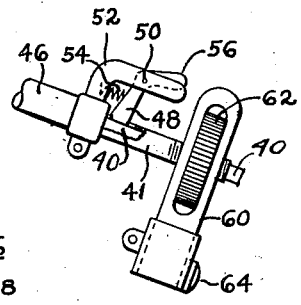
Fig. 3 is an enlarged fragmentary detail view of a portion of the device disclosed in Fig. 2.

Fig. 5 discloses a schematic wiring diagram of a modification.

Fig. 6 discloses a schematic wiring diagram of another modification.

Fig. 7 discloses a schematic wiring diagram of a third modification.

In testing bodies for unbalance, it is very desirable to have an indicator that indicates the angle of unbalance instantaneously and accurately, irrespective of the position of the angle of unbalance. Furthermore, it is very desirable to have a device that will indicate both the angle of unbalance and the magnitude of unbalance upon the same dial or screen instantaneously. This device should preferably measure the angle of unbalance irrespective of the speed of the rotating body and if an electrical contact is used, irrespective of the frequency of the pulsating current. In other words, the circuit should preferably show the angle of unbalance without any phase shift. This may be accomplished by utilizing a circuit that does not have any inductances and capacities, as has been disclosed in the Moore copending applications Serial Nos. 680,225 and 104,075 supra. When using a cathode-ray oscillograph for indicating the angle of unbalance the voltage is applied to the deflecting plates, thereby eliminating any hazards incurred by the current either lagging or leading the voltage.

Referring to the drawings, the reference numeral 10 indicates the base of a balancing machine having mounted thereupon a plurality of standards 12, each provided with a centrally disposed vibratory support 14 fixedly mounted upon the base 10 and carrying a vibratory head 16 that may be locked in position by a pin 18 actuated from locked position to unlocked position by a suitable handle 20 passing through an angular or diagonally disposed slot 22. When the pin or latch 18 is in the "down" position the vibratory head 16 is free to oscillate upon the vibratory support 14.

The vibratory head 16 may be provided with suitable bearings 26 adapted to rotatably support the body 28 to be tested, which may be driven through a flexible drive connection 30 from a suitable motor 32, provided with a speed control lever 34.

When the circuit through the motor is closed the motor will rotate the body 28 to be tested at any speed desired by manually adjusting the lever 34. If the body to be tested is unbalanced, centrifugal force will cause the vibratory head 16 to oscillate upon the vibratory support 14, that is, when the pin 18 is in the "down" position. The oscillation of the vibratory head 16 may be utilized to indicate the angle of unbalance and the magnitude of unbalance. The device for indicating the magnitude of unbalance will now be described.

A gauge 38 may be mounted upon the standard 12 and is provided with a suitable reciprocatory stem 40 actuated in one direction by an abutment 42 mounted upon the oscillatory or vibratory head 16. The stem 40 through a suitable mechanical amplifying device actuates a pointer 44 underlying a suitable dial on the gauge 38. The face of the dial may be provided with suitable graduations having proper indicia from which the magnitude of unbalance may be ascertained. This magnitude of unbalance may be determined from suitable charts or derived from formulas applicable to the body tested at the particular frequency at which the reading is taken.

Figure 2:
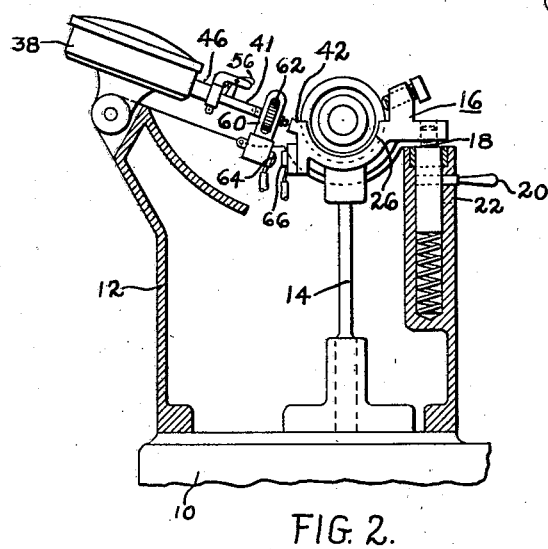

The stem 40 is preferably mounted for movement in only one direction, that is, the stem 40 may be telescoped into the sleeve 46 but the return movement is prevented by a latch 48 pivotally mounted at 50 to a suitable bracket 52 fixedly attached to the tubular sleeve 46. The stem 40 is provided with a smooth surface that is engaged by member 48 biased in a counter-clockwise direction, as viewed in Fig. 2, by a suitable spring 54. In order to release member 48 and the stem 40, it is merely necessary for the operator to actuate the push button 56, which rotates member 48 in a clockwise direction against the spring 54 out of clearance with the surface of the stem 40, thereby permitting the stem 40 and the pointer 44 to return to zero position.

A reduced tubular extension 41 is provided with a slot for member 48 and also carries a bracket 60 adjustably mounted upon the extension 41 by a suitable screw 62. Bracket 60 on its lower end carries a contact member 64 aligned with a contact member 66 mounted upon the vibratory head 16 in such a relation that contacts 64 and 66 close an electrical circuit during each revolution of the rotary body. The contacts 64 and 66 are included in an electrical circuit including a device for indicating the angle of unbalance, which will now be described.

As may be best seen by referring to Fig. 4, the contacts 64 and 66 are connected to a pair of leads 68 and 70, the lead 68 being connected to one side of an annular resistance member 72 and the lead 70 having its other end connected to one terminal of a battery 75, having a terminal connected through a lead 76 to the opposite side of the annular resistance member 72.

The two halves of the annular resistance member 72 are equally balanced, that is, the resistance of one half is equal to the resistance of the other half, so that the midpoint indicated by reference character 78 which has been grounded has a zero potential. The resistance element 72 is connected to a cathode-ray tube by a circuit arrangement which includes the following elements.

One deflecting plate 80 of the cathode-ray tube is connected by a suitable lead 82 through a brush 84 to the slip ring 86. This slip ring 86 is electrically connected to a rotary contact arm 88 contacting the resistance element 72 and rotating in synchronism with the body 28 to be tested.

Another deflecting plate 90 is connected by a suitable lead 92 to a brush 94 contacting with a second slip ring 96, electrically connected to a rotary contact 98, also rotating in synchronism with the body 28 to be tested, but disposed at an angle of 90° from the rotary contact 88. This arrangement supplies a rotary field to the cathode-ray tube whenever the contacts 64 and 66 are closed. The plates 100 and 102 in the cathode-ray tube, oppositely disposed with respect to the plates 80 and 90 respectively, are grounded.

Let it be assumed that the rotary contacts 88 and 98 rotate in a clockwise direction in synchronism with the body 28. As the contact 88 rotates downwardly, it will eventually come in contact with the point 78 which is grounded. At this instant of time the voltage supplied to the plate 80 will be zero. When in this position, the contact 98 will have rotated to a vertical position, as viewed in Fig. 4, being then supplied with the maximum positive voltage, so that the maximum amount of positive voltage is supplied to the plate 90, assuming, of course, that the contacts 64 and 66 are closed at this instant of time. As the contacts continue rotating, the contact 88 will be supplied with a negative voltage, which will be increasing and the contact 98 supplied with a positive voltage that is decreasing, until the contacts have rotated through another quadrant, when the contact 88 will be supplied with the maximum negative voltage and the contact 98 with zero voltage, again, assuming that the contacts 64 and 66 are closed at this instant of time.

It is well known to those skilled in the art that the cathode-ray is deflected towards the positive plate and away from the negative plate. Furthermore, it is well known that the magnitude of deflection by either plate is proportional to the voltage supplied to the plate. From this arrangement it can be readily seen that if the contacts 64 and 66 remain closed, the cathode-ray will travel through a substantially circular path about the center of the screen 104. As the cathode-ray will be deflected only when the contacts 64 and 66 are closed by the movement of the vibratory support, the angle of unbalance may readily be determined. As the contact 64 is carried by the tubular extension 41, which adjustably supports bracket 60, this bracket 60 is preferably adjusted so that the contacts 64 and 66 will remain closed for only a very short period of time during each revolution of the rotary body 28 when the body is tested. If this period of time is too great, the bracket 60 may be adjusted by rotating the screw 62, so as to cause the contact 64 to close for a sufficient period of time. The angle of unbalance is preferably measured when the body rotates at a speed higher than the critical speed.

In the event that the voltage supplied by the battery 75 does not produce the desired deflection, resistances may be added to the battery circuit so as to reduce the battery voltage, thereby reducing the magnitude of deflection. If the voltage is insufficient across the terminals of the battery 75, amplifiers may be added to the circuit between the slip rings 86 and 96 respectively, and the plates 80 and 90. Any suitable cathode-ray circiut may be used to amplify the signals or voltages and to energize the cathode-ray tube. Such circuits are disclosed in "The Cathode-Ray Tube at Work" by Rider, published by John F. Rider, 1440 Broadway, New York city.

In the modification disclosed in Fig. 5 a pair of contacts 110 and 112 has been mounted upon the vibratory support and a pair of cooperating contacts 114 and 116 has been mounted in fixed spaced relation from the contacts 110 and 112. These contacts have been mounted between the deflecting plates 80 and 90 of the cathode-ray tube and slip rings 120 and 122 respectively. The slip ring 120 is connected to one terminal of an armature or generator winding 124 mounted for rotation between a pair of poles 126 and 128. The other terminal of the winding 124 may be grounded to the rotor shaft 130, grounded in any suitable manner.

The slip ring 122 is connected to a winding 134, having the other end thereof grounded to the shaft 130. The winding 124 is displaced 90° out of phase with the winding 134, so that the phase displacement of the voltage that is generated by the two windings is 90°. For the sake of clearness the windings 124 and 134 have been separated. These windings are mounted upon the same laminated core 135, rotating between a single pair of pole pieces 126 and 128. By closing the contacts 110 and 114 and the contacts 112 and 116 by the vibration of the vibratory support, it can be readily seen that the cathode-ray is deflected upon the screen 104 to indicate the angle of unbalance. The magnitude of deflection may be controlled by a pair of suitable variable resistors 140 and 142 connected from the high potential terminal of the windings 124 and 134 to the ground. By adjusting the contacts, the magnitude of the voltage may be changed.

In the modification disclosed in both Figs. 4 and 5, the voltage applied to the deflecting plates 80 and 90 is absolutely independent of the magnitude of deflection. The angle of unbalance is indicated and that is all. The magnitude of unbalance is determined by the gauge 38 mounted upon the standards.

In the modification shown schematically in Fig. 6, a device for generating voltage in proportion to the magnitude of unbalance has been shown.

In the modification disclosed in Fig. 6, the contacts actuated by the vibratory support have been eliminated and instead thereof, an auxiliary voltage is generated in response to the vibration of the vibratory support, which may be impressed upon either one of the plates 80 or 90 to indicate the angle of unbalance.

A generator including the rotor windings 124 and 134 generates a two phase alternating current that is displaced 90° with respect to each other in a manner identical to that disclosed in Fig. 5. The slip ring 120 connected to the winding 124 is connected by a lead 141 through a switch 143 to the plate 90. The slip ring 122 supplies a voltage through the lead 144, including a switch 146, to the plate 80.

In addition to these voltages an induction or pick-up coil 150 is carried by the vibratory head 16. This coil links a portion of the flux from the fixed electromagnet 152, which may be either a permanent magnet or separately excited magnet, excited from a suitable source of direct current, through the magnetic coil 154. As the coil 150 vibrates with the vibratory support, the number of lines of flux linking the coil 150 varies. One end 156 of the coil 150 is connected through a suitable switch 158 either to a terminal 160 in the lead 141, or to a terminal 162 in the lead 144. The other terminal 164 of the coil 150 is connected by a switch 166 either to the terminal 168 in the line 141, or the terminal 170 connected to the lead 144. The switches 158 and 166 should be closed through the same line simultaneously, that is, if it is desirable to connect the voltage generated by the coil 150 into the circuit of the deflecting plate 90, switch 158 is connected to the terminal 160, and the switch 166 to the terminal 168. At the same time the switch 143 should be open. This causes the voltage generated by the coil 150 to be impressed upon the deflecting plate 90. In the event that this voltage is impressed upon the deflecting plate 90 about the same time as the voltage generated by the coil 124 also supplied to this plate 90 is zero, or very nearly so, the reading upon the cathode-ray tube will be very indefinite and nearly meaningless. If this is the case, the voltage generated by the coil 150 should be impressed upon the deflecting plate 80. This may be accomplished by shifting the switch 158 from the terminal 160 to the terminal 162 and the switch 166 from the terminal 168 to the terminal 170, closing the switch 143 and opening the switch 146. By so doing, the circuit is completed through the switch 143 from the winding 124 to the deflecting plate 90 and the circuit is completed through the winding 134 connected in series with the winding 150 to the deflecting plate 80.

The switches 143, 146, 158 and 166 are preferably mounted upon a common actuator, so that all the switches may be actuated simultaneously so as to throw the coil 150 in series either with the coil 124 or with the coil 134. The voltage generated by the coil 150 may be amplified by a suitable amplifier 172. The resistors 140 and 142 may be varied so as to control the voltage output of the coils 124 and 134.

In some installations it might be desirable to use one of the deflector plates as a sweep circuit, that is, by connecting the plate to the A. C. winding, and to impress only the impulse voltage upon the other plate. For the purpose of illustration, let it be assumed that the A. C. voltage generated by the coil 124 is supplied to the deflecting plate 90 and only the impulse voltage generated by the pick-up coil 150 is impressed upon the deflecting plate 80. The alternating sine wave current will then cause a straight horizontally disposed line to be shown on the screen 104, that is, in the absence of any voltage impulse being supplied to the deflecting plate 80. If the deflecting plate 80 is connected to the coil 150, having its other terminal grounded, the line across the face of the screen 104 will be deflected. From the deflection it may readily be determined on which side of the center the deflection takes place, also the number of degrees the angle of unbalance is from the vertical center axis of the screen; but the particular quadrant containing the deflection is indefinite. If, for example, the deflection takes place to the right of the vertical axis, the angle of unbalance is located in either the first or the fourth quadrant.

By disconnecting the A. C. voltage supplied to the deflecting plate 90 and disconnecting the plate 80 from the coil 150, and connecting this plate to the coil 134, a vertically disposed sweep circuit is obtained on the screen 104. Now, by connecting the voltage impulses supplied by the pick-up coil 150 to the plate 90, the sweep circuit line will be deflected either above or below the center horizontal axis of the screen 104. If deflection takes place above the axis it is caused by an unbalanced condition in either the first or the second quadrant; but from the horizontal sweep circuit line it was determined that the unbalance must be in either the first or the fourth quadrants. This leaves the angle of unbalance in the first quadrant.

The same circuit arrangement may be used to analyze unbalanced conditions in bodies having both rotary and reciprocatory or other moving parts, as for example airplane engines. The A. C. generator, including the coils 124 and 134, may then be driven in synchronism with the crank shaft of the engine, and the pick-up coil 150 together with its associated magnet connected for a relative movement with respect to each other on the engine at various points to indicate the angle, the degree, the period, the direction of vibratory movements and the phase relation of the vibratory movements with respect to the crank shaft.

In the modification disclosed in Fig. 7, the shaft 130 supports the rotor 13" in close proximity to the vibratory head 16, so that the rotor 135, including the windings 124 and 134, moves inwardly and outwardly from an E-shaped electromagnet 180 mounted upon a fixed support 182. Again, for the purpose of clearness, the winding 124 has been separated from the winding 134, although in actual construction the two windings would be mounted upon the same laminated core and moving towards and away from the same electromagnet 180. The voltage generated by the windings 124 and 134 will be influenced by the relative position of the rotor 135 with respect to the stator 180, that is, when the heavy part of the body to be tested actuates the rotor 135 to the right, as viewed in Fig. 7, the rotor is moved into or towards the magnet 180, so as to cause the windings 124 and 134 to link a greater number of lines of flux. Now, as the heavy portion of the body actuates the rotor towards the left, as viewed in Fig. 7, the rotor 135 links a lesser number of lines of magnetic flux. Thus, it is seen that a variable voltage is generated in the windings 124 and 134 that is supplied to the deflecting plates 80 and 90 of the cathode-ray tube. By this arrangement, as may be readily seen, the angle of unbalance may be determined by the relative position of the curve or closed loop that is seen on the cathode-ray tube screen 104.

A disc 190 mounted adjacent to the rotor 135 is adapted to abut a stop member 192 fixedly mounted upon the support 182 to prevent the rotor 135 coming in direct contact with the electromagnet 180 if the swing of the vibratory head 16 should become excessive. This prevents injury to the rotor and the stator. The disc 190 as shown rotates with the rotor 135. Instead of such a disc, any suitable abutment member rotatably mounted upon the shaft 130 may abut member 192 carried upon the support 182 to prevent injury to the generator.

The voltages supplied to the generator plates may be controlled by adjusting the variable resistors 140 and 142. These resistors may be adjusted by a graduated knob or dial 145. The cathode-ray may be adjusted to a predetermined position on the screen 104 by turning the knobs 145 either to the right or to the left. The amplitude of deflection of the body to be tested may be determined by the adjustment of the knobs 145 in the modifications disclosed in Figs. 6 and 7. Each graduation on these knobs may represent a certain weight required to counteract the unbalanced condition of the body tested. The magnitude of weight, of course, is determined from experiments upon like bodies.

In addition thereto if necessary the voltages may be amplified through suitable amplifying means generally found within conventional cathode-ray oscillographs now on the market. These amplifying means are generally controlled by a graduated dial, so that the degree of amplification may be obtained from the dial reading and thereby the magnitude of unbalance may be determined.

Although the preferred modification of the device has been described, it will be understood that within the purview of this invention various changes may be made in the form, details, proportion and arrangement of parts which generally stated consists in a device capable of carrying out the objects set forth, in the novel parts, combination of parts and mode of operation, as disclosed and defined in the appended claims.

Having thus described my invention, I claim:

1. A device for testing a rotary body including means for rotating the body at high speed, a cathode-ray oscillograph having a cathode-ray tube having means for deflecting the cathode-ray, means for producing a rotating field for deflecting the cathode-ray, said field rotating in synchronism with the body to be tested, and means responsive to the unbalanced condition of the body for cyclically energizing said deflecting means of the cathode-ray tube from said rotating field to thereby indicate the angle of unbalance.

2. A device for testing a rotary body including means for rotating the body, means for producing an electrostatic field rotating in synchronism with the body, a cathode-ray oscillograph including a cathode-ray tube, and means responsive to the unbalanced condition of the body for cyclically connecting the rotating electrostatic field to the deflecting plates of the cathode-ray tube.

3. In a dynamic balancing machine for testing a rotary body, the combination including means for rotating the body at high speed, means for generating a two phase alternating voltage synchronized with the rotating body, a cathode-ray oscillograph including a cathode-ray tube, and means responding to the angle of unbalance of the body for connecting the alternating voltage to the cathode-ray tube to thereby indicate the angle of unbalance.

4. In a dynamic balancing machine for testing the angle and magnitude of unbalance of a rotary body, the combination including a vibratory support for the body to be tested, means for rotating the body at high speed upon the vibratory support, a cathode-ray oscillograph including a cathode-ray tube having a screen, means interconnected to the deflecting plates of the cathode-ray tube for generating polyphase alternating current synchronized with the rotation of the body to be tested, and auxiliary means for generating a voltage responsive to the angle of unbalance transmitted to the vibratory support selectively supplied to the deflecting plates to indicate the angle and magnitude of unbalance.

5. In a dynamic balancing machine for testing rotary bodies for unbalance, the combination including a vibratory support for the body to be tested, means for rotating the body mounted upon the vibratory support, a cathode-ray oscillograph including a cathode-ray tube having means when energized for deflecting the cathode-ray, voltage generating means for generating polyphase voltages energizing said deflecting means, said voltage generating means being synchronized with the rotation of the body to be tested, auxiliary means for generating a voltage responsive to the angle and degree of unbalance transmitted to the vibratory support by the body, and means for selectively supplying the voltage responsive to the angle and degree of unbalance to the deflecting means to indicate the angle and degree of unbalance.

6. In a device of the character described, the combination of a cathode-ray oscillograph including a cathode-ray tube having means for deflecting the cathode-ray when energized, with means for generating polyphase alternating voltages supplied to the deflecting means for energizing the same, and means for cyclically disturbing the energization of said deflecting means, the phase relation of said disturbing means being indicated upon the screen of the cathode-ray oscillograph.

7. In a device of the character described for use with a body having periodic movements, the combination including a cathode-ray oscillograph having a cathode-ray tube provided with means for deflecting the cathode-ray when energized, means for generating pulsating voltages synchronized with the movement of the body, and means for cyclically interconnecting the voltage generating means with the deflecting means of the cathode-ray oscillograph for indicating the relative phase relation of the voltage impulses to the movement of the body.

8. In a device of the character described for use with a body having rotary movements and vibratory movements, the combination including a cathode-ray oscillograph having a cathode-ray tube provided with means for deflecting the cathode-ray, current generating means for generating polyphase alternating current synchronized with the rotation of the body for energizing the deflecting means of the cathode-ray tube so as to supply a rotary field to the deflecting means, and auxiliary current generating means generating a current synchronized with the vibratory movement of the body, said auxiliary means energizing the deflecting means of the cathode-ray tube cyclically so as to indicate the phase relation between the vibratory movements and the rotary movements of the body.

9. In a device of the character described for use with a body having cyclic movements, the combination of a cathode-ray oscillograph having a cathode-ray tube provided with means for deflecting the cathode-ray horizontally, and means for deflecting the cathode-ray vertically with current generating means for generating currents synchronized with the cyclic vibratory movements of the body, and means for cyclically supplying the generated currents selectively to the horizontal deflecting means and the vertical deflecting means for indicating the phase relation between the generating means and the cyclic movements of the body.

10. In a device of the character described for analyzing parasitic vibrations in bodies including rotary parts, the combination of a cathode-ray oscillograph including a cathode-ray tube having means for deflecting the cathode-ray with current generating means for energizing said deflecting means, said current generating means including an A. C. current generator synchronized with a rotary part of the body to be analyzed for energizing said deflecting means, and current generating means responding to vibratory movements caused by the body to be energized, said second current generating means also energizing the deflecting means so as to indicate the angular relation and the magnitude of the vibratory movements.

11. In a device of the character described for analyzing parasitic vibrations in bodies including rotary parts, the combination of a cathode-ray oscillograph including a cathode-ray tube having vertical and horizontal cathode-ray deflecting means with current generating means for cyclically energizing the vertical deflecting means in synchronism with the rotation of a rotary part of the body, a second current generating means responsive to the vibratory movements of the body to be analyzed for energizing the horizontal deflecting means, and graduated means for indicating the magnitude of parasitic vibrations of the body.

12. In a device of the character described for analyzing parasitic vibrations in bodies including rotary parts, the combination of a cathode-ray oscillograph including a cathode-ray tube having vertical and horizontal cathode-ray deflecting means with current generating means for cyclically energizing the vertical deflecting means in synchronism with the rotation of a rotary part of the body, a second current generating means responsive to the vibratory movements of the body to be analyzed for energizing the horizontal deflecting means, and graduated means for controlling the deflection of the cathode-ray, said graduated means indicating the magnitude of the parasitic vibrations.

HENRY G. DYBVIG.